United States Patent [19]

Hinkel et al.

[11] Patent Number: 4,624,048
[45] Date of Patent: Nov. 25, 1986

[54] METHOD OF MAKING MAGNETIC HEAD SLIDERS

[75] Inventors: Holger Hinkel, Boeblingen; Gerhard Kaus, Moetzingen; Ulrich Kuenzel, Kusterdingen; Gerhard Schmid, Leinfelden/Echterdingen, all of Fed. Rep. of Germany

[73] Assignee: International Business Machines, Armonk, N.Y.

[21] Appl. No.: 638,314

[22] Filed: Aug. 6, 1984

[30] Foreign Application Priority Data

Aug. 17, 1983 [DE] Fed. Rep. of Germany .................. 83108126[U]

[51] Int. Cl.$^4$ .............................................. G11B 5/42
[52] U.S. Cl. .................................. 29/603; 156/659.1; 156/665; 360/103
[58] Field of Search .................... 29/603; 360/103; 156/654, 659.1, 660, 661.1, 665

[56] References Cited

U.S. PATENT DOCUMENTS 4,226,018 10/1980 Nakanishi et al. .................. 29/603
4,333,229 6/1982 Ellenberger ........................ 29/603

Primary Examiner—Carl E. Hall
Attorney, Agent, or Firm—Otto Schmid, Jr.

[57] ABSTRACT

For making rails in workpieces for magnetic head sliders for sensors of magnetizable media, anodic oxidation of highly pure aluminum substrates is applied. For that purpose, the respective surface of the substrates is covered with a mask cover which leaves uncovered the zones in the substrate surface area which are intended for the forming of rails. By means of anodic oxidation of the aluminum in the exposed regions, rail layer regions of oxide are formed which after the removal of the mask cover can themselves be used as an etching mask in order to provide a recessed region between two respective rails by means of chemical wet etching.

7 Claims, 9 Drawing Figures

METHOD OF MAKING MAGNETIC HEAD SLIDERS

DESCRIPTION

BACKGROUND OF THE INVENTION

1. Field of the Invention

The invention relates to a method of making magnetic head sliders to be used in magnetomotive storage apparatus, based on a flat workpiece out of which several magnetic head sliders equipped with rails and magnetic heads are manufactured simultaneously.

2. Description of the Prior Art

The magnetic head consists of an electromagnetic or magnetic arrangement for writing, reading or erasing data on a magnetizable storage medium movable relative thereto which in the described embodiment however consists of a magnetic disk. All known kinds of magnetic head arrangement can be used, as ring electromagnets with air gap, Hall effect components, magnetoresistive components, etc., although the embodiment described refers to an inductive electromagnetic arrangement exclusively.

A magnetic head slider of that kind as it forms the basis of the invention, is known from U.S. Pat. No. 3,855,625 which describes the essential features. The description given there depicts not only where the magnetic heads are attached to the magnetic head slider, but also that the latter can have a great variety of shapes at its trailing edge, if the magnetic head-equipped surface is considered to be the leading edge. The embodiment described there specifies in particular that apart from the longitudinal rails an additional cross rail is provided. The respective rail design is directed to aerodynamic characteristics, and can therefore be disregarded in connection with the present invention, as the method as disclosed by the invention can be considered to be substantially independent thereof. Concerning the embodiment described therefore a magnetic head slider with merely two longitudinal rails is referred to for better understanding.

Typical dimensions for such magnetic head sliders are: 4×3 mm with a rail width of 0.5 mm and a rail depth between 5 and 20 μm. The magnetic head slider consists of ceramic and is shaped out of a square workpiece of corresponding dimensions by means of grinding, chemical etching, cathode sputter etching, or ion beam etching; i.e. between the surface regions provided for the rails the material of the magnetic head slider is etched off down to the depth corresponding to the necessary rail height. The rail surfaces are lapped, so that the peak-to-valley height is made to reach a value of less than 25 nm. For manufacture, the workpiece can be such that several magnetic head sliders can be made simultaneously. Following the final process step, the workpiece merely has to be divided into the individual magnetic head sliders.

Owing to the fact that the workpiece consists of ceramic material, process problems arise which are even intensified and increased by the use of the necessary mask process steps.

SUMMARY OF THE INVENTION

In order to eliminate hitherto encountered manufacturing problems, and to simplify the process steps in the manufacture of the above specified magnetic head sliders, which are preferably planned to be used for extremely low flight heights round 0.3 μm and less, the magnetic head sliders in accordance with present invention are made from a flat workpiece of highly pure aluminum. The method for making the magnetic head sliders comprises the steps of anodically oxidizing a predetermined area of a first longitudinal workpiece surface extending in the direction of the length of the magnetic head slider to form an anodic oxidation aluminum oxide layer, with the predetermined area extending along the edges of the magnetic head sliders and having the shape required to form rail surfaces, etching the workpiece, using the anodically oxidized layer as a mask, to form recessed regions of predetermined depth and to simultaneously form rails of the same configuration as the rail surfaces, and lapping the rail surfaces to give a surface finish defined by a predetermined peak-to-valley height so that the rails and the recessed region produce a predetermined flight height when the magnetic head slider is positioned adjacent a moving magnetic medium.

In the finished part made in accordance with the present invention, one advantage consists in that as the surface of the recessed region between the rails is electrically conductive, no electrostatic charges, with all their disadvantages, can form there. The mask covering of anodic oxidation for the purpose of making the rail surfaces need only cover the regions between the rails if the material of the magnetic heads affixed thereto cannot be attacked thereby, otherwise the mask cover has to extend further than that.

The further advantages arising out of the invention consist in that, with a very uncomplicated process sequence, the rail structure can be realized in its lateral and vertical surface parts precisely in accordance with the specifications. This applies in particular to magnetic head sliders with electromagnetic heads affixed thereto, whose pole tips extend from the magnetic yoke with parallel straight edges vertically to the rail surfaces, the pole surfaces limiting the pole tips being flush therewith. The length of the pole tips between magnetic yoke and pole surface however is critical for the optimum operation of electromagnetic heads. During the final lapping of the rail surfaces to a peak-to-valley height of at least 50 nm the pole surfaces are included, too, owing to the invention, so that if the magnetic heads are suitably applied in a corresponding height on the leading edges of the magnetic head sliders the length of the pole tips can be adjusted very precisely to less than 3 μm simultaneously with the lapping of the rail surfaces.

By means of the process development in anodic oxidation, including fixed operating temperatures, an individually predetermined peak-to-valley height and/or defined porosity of the rail surfaces can be achieved within a wide scope, so that the absorption and retention of lubricant can be predetermined or set, respectively, as required. This means that the deposition of lubricant in the recessed region between the rails can thus be substantially avoided.

The workpiece out of which the magnetic head sliders are personalized can be of different design. In the embodiment of the description, the invention is developed to the effect that a highly pure aluminum plate represents the blank onto which, prior to its being divided into the individual workpieces, the magnetic heads are applied first with their lands in pairs, arranged in parallel rows, in printed circuit or vacuum coating technique as thin film magnetic heads. The cut surfaces are arranged in the blank in such a manner that they approximately provide already the pole tips required.

The growth of the layer regions formed by anodic oxidation can be ascertained via the electric load flow by measuring the current following the function $\int I\,dt$, or by a photo-optical in situ method at the effectively transparent $Al_2O_3$ layer.

Further advantageous developments and designs of the invention are specified in the subclaims.

The method as disclosed by the invention is not limited to the implementation of the embodiment described here of a magnetic head slider. This means that e.g. the rails at the trailing edge of the magnetic head slider do not have to be of a tapering shape, and/or the longitudinal rails can be supplemented by an additional cross-rail. For aerodynamic reasons the rails themselves can differ in their width from the linear design.

The foregoing and other objects, features and advantages of the invention will be apparent from the embodiment of the invention as illustrated in the accompanying drawings.

BRIEF DESCRIPTION OF THE DRAWINGS

In the following, the invention will be specified with reference to the drawings.

The drawings show the following.

DESCRIPTION OF THE PREFERRED EMBODIMENT

Figure 1:
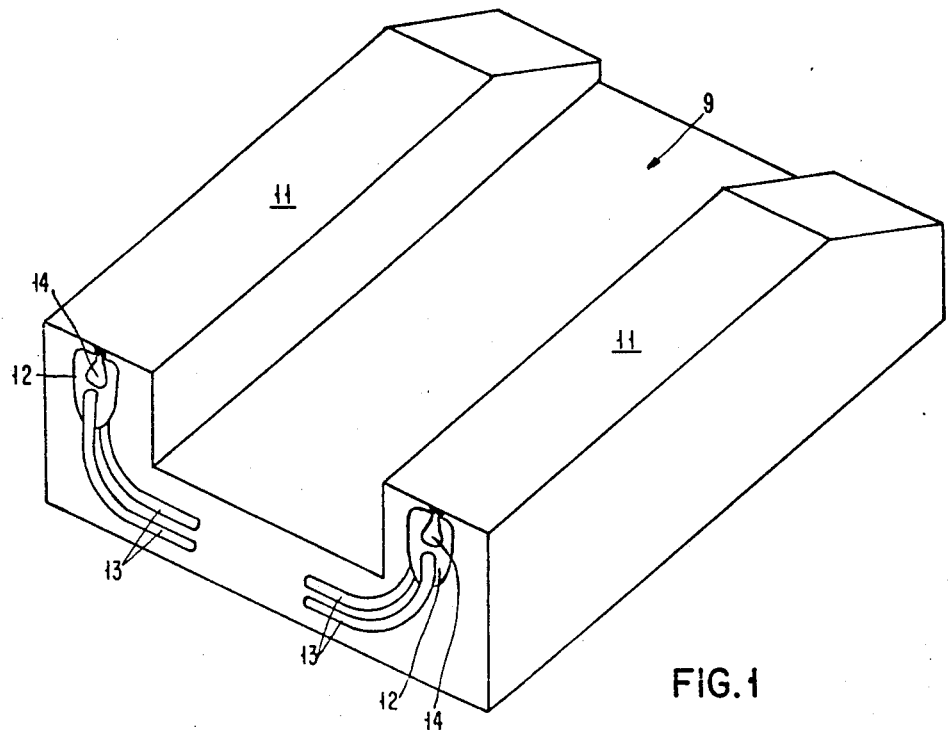
FIG. 1 is a perspective view of an embodiment for a magnetic head slider with magnetic heads applied thereon, including the associated lands.

The embodiment of FIG. 1 for a magnetic head slider represents one of the forms that have been specified above, and which are used according to aerodynamic characteristics. For the invention the essential feature merely consists in that the rail surface is provided at an angle to the leading edge of the magnetic head slider. This leading edge carries the magnetic head assemblies 12, 13, i.e. during operation of the magnetomotive storage equipped therewith it is at the front of the magnetic head slider. The tapering of rails 11 within the range of the trailing edge of the magnetic head slider is of secondary importance for implementing the manufacturing process as disclosed by the invention. The magnetic head slider of the method specified here has at its longitudinal edges rails 11 enclosing a recessed region 9. The leading edge of the magnetic head slider which in the given embodiment is provided normal to the rail surface is equipped at the fronts of rails 11 with magnetic head assemblies 12, 13 which can comprise electromagnetic or magnetic components.

While an electromagnetic arrangement is understood to contain a magnetic head consisting of yoke, pole tips and coil, magnetic assemblies are available in the form of Hall effect and magneto-resistive sensors. Here again it is of no importance for the invention what kind of magnetic head is to be provided, although in developments of the method as disclosed by the invention the use of an electromagnetic arrangement offers particular advantages. For that reason, an electromagnetic arrangement is assumed as magnetic head in the discussion of the invention.

Figure 2:
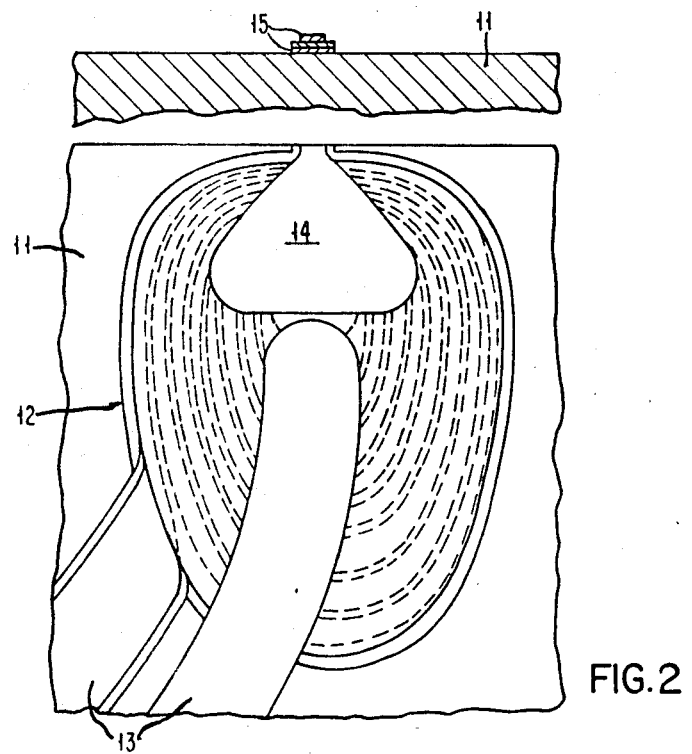
FIG. 2 is a plan view of a thin film magnetic head with both lands, and a partial cross section in the area of the pole tips.

Onto the leading edge of the magnetic head slider consisting of highly pure aluminum the magnetic head assemblies 12, 13 are applied under insulation therefrom which consist of a flat coil, the yoke elements insulated therefrom, and the insulated lands 13 which are connected to the coil ends and which on the other hand serve for the connection to a series-arranged amplifier. Top yoke element 14 and the bottom yoke element which is not visible are relatively broad in the coil area and taper into pole tips 15 which, separated by a non-magnetic intermediate layer extend with parallel edges perpendicularly down to the edge of the rail surface which is flush with the pole surface formed by the pole tips with intermediate layer. This is shown in detail in FIG. 2. The length of pole tips 15, of which the one placed immediately on the leading edge of the magnetic head slider is broader than that associated to yoke element 14 represents a critical value which for the optimum operation of a magnetomotive storage equipped with such a magnetic head slider should not be outside a range from 1.5 to 2.0 $\mu$m. The pole tip length extends from the pole surface to the transition point to the respective yoke element.

All elements of the electromagnetic head assembly are advisably applied by means of printed circuit technique or vacuum coating technique on the leading edge of the magnetic head slider within the range of the respective rail front. The insulating layers required for insulation between yoke elements and coil on the one hand, and lands 13 and coil on the other can consist of $Al_2O_3$, which furthermore can be used for embedding the magnetic head arrangement in a protective coating on the magnetic head slider.

In known magnetic head sliders made of hard ceramic material, the regions between rails 11 are etched into recessed regions in the corresponding workpieces, e.g. by ion etching methods. That process, as well as others, is very time-consuming and complex, so that new methods have to be applied for eliminating such disadvantages. It has furthermore become evident that rails 11 made in this manner cannot satisfy all demands made in operation with magnetomotive storages. To give an example, it is not only necessary for such rails 11 to be substantially wear-resistant, the gliding surfaces should additionally be of a certain porosity to permit advantageous storing of lubricant in the surface area involved. Rails with such a porosity in the sliding zone can be advantageously achieved if anodic oxidizing of aluminum is applied, as in accordance with the invention.

Porous layers of anodic oxide can be made on aluminum by means of electrolytes in which anodic oxide is partly soluble, with pores being left by the process of the solution. The ratio between the thickness of a thus formed oxide layer and that of the layer of dissolved aluminum oxide is derived from the balance between oxide forming speed and dissolving speed in the electrolyte.

In connection with highly pure aluminum, the thickness of the oxide layer formed is only a function of the amount of the transported charge, which can be computed by applying the Faraday laws. However, the speed of the oxide dissolution mainly depends on the electrolyte, its concentration and temperature, and on the current density in the electrolyte.

The forming of steps at the edges of anodized structures, and consequently the planarity of the respectively created oxide surfaces with their surroundings can be set by correspondingly varying the above operating parameters. There applies the general rule that with increasing temperature of the electrolyte and decreasing current density in the forming of the aluminum oxide layer the amount of dissolved oxide increases, so that the step height at the edges of a structure to be anodized has to decrease, too.

An advantageous means for the process as disclosed by the invention has proved to be an 8% oxalic acid as the electrolyte for anodic oxidation of aluminum, however, the electrolyte temperature should not be less than approximately 50° C. in that case. An optimum would be a temperature of 70° C., last but not least in view of the fact that the aluminum oxide formation is more toward the bulk of the material, and does not grow very much out of the surface. If necessary, step formation can be prevented by inserting an etching process step prior to the oxidation process, in order to compensate the external growing of the oxide.

The production of such magnetic head sliders starts from a workpiece 1 (FIG. 4) which consists of highly pure aluminum, and whose width corresponds to the length, and whose thickness corresponds to the height of the magnetic head sliders to be made thereof. While into the first longitudinal workpiece surface associated to the thickness rails 11 as well as recessed regions 9 therebetween are to be made, the second longitudinal workpiece surface provided vertically thereto already contains the pairs of magnetic heads with their lands 13.

Before the processing of workpiece 1, separating grooves 17 are made at the respective predetermined separating position between the individual magnetic head sliders, and subsequently it is mounted on a workpiece holder 16. Depending on the mode of mounting workpiece 1 on workpiece holder 16, separating grooves 17 in workpiece 1 are made continuously, or merely approaching the longitudinal support surface of workpiece 1, because mechanical processes should, if possible, be terminated before the application of rails 11 and recessed regions 9 therebetween.

Figure 3:
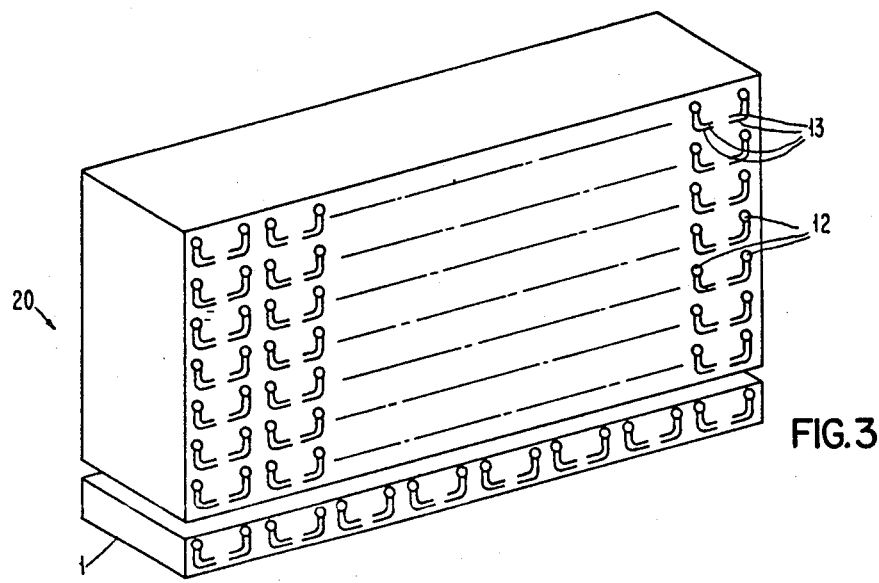
FIG. 3 is a perspective view of a blank with a plurality of magnetic heads provided in rows thereon.

The manufacture of the individual workpieces 1, e.g. out of a highly pure aluminum blank 20, is described with reference to FIG. 3. Prior to the dividing into the individual workpieces 1 with the predetermined widths and thicknesses, blank 20 consisting of a rectangular plate with a thickness corresponding to the length of the magnetic head slider is equipped row-wise with pairs of magnetic heads and their lands 13 on one of its main surfaces, using methods of printed circuit technique or vacuum coating technique, particularly of thin film processes. Magnetic heads 12 are arranged in such a manner at the cut surfaces provided for division that after the dividing of blank 20 into the individual workpieces 1 the respective pole tips automatically show at least almost the full length, so that in the subsequent lapping process step of the rail surfaces they can be adjusted into the exact length within the range from 1.5 to 2 $\mu$m. It is obvious that the vertical spacing between the individual pairs of magnetic heads considers the cutting losses due to separating grooves 17 to be made.

As mentioned above and depicted in FIG. 4, workpieces 1 made out of blank 20 are bonded onto a workpiece holder 16 whose fixing surface has grooves 21 vertically to the longitudinal direction of workpiece holder 16, at a spacing which corresponds to the spacing of separating grooves 17 to be made in workpiece 1 between the magnetic head sliders provided. The width of grooves 21 is greater than that of separating grooves 17 to avoid precision adjustments in the bonding of workpieces 1 to the fixing surface of workpiece holder 16. The depth of grooves 21 depends on the separating tools for dividing workpieces 1 into magnetic head sliders to exclude damaging workpiece holder 16 during the processing of workpieces 1. After the application of workpieces 1 obtained through the dividing of plate shaped, highly pure aluminum blanks 20, separating grooves 17 can be made continuously in workpiece 1, even prior to the following of the process steps according to the invention for making rails 11 with recessed regions 9 therebetween, so that after the termination of the process steps according to the invention individual magnetic head sliders are directly obtained upon the separation from workpiece holder 16.

With reference to FIGS. 6 to 9, the process steps for making rails 11 with recessed regions 9 therebetween will be described in detail. It is assumed that separating grooves 17 do not reach up to the longitudinal fixing surface of workpieces 1. The representations are not true to scale, i.e. they do not permit any conclusions with respect to dimension ratios.

Figure 4:
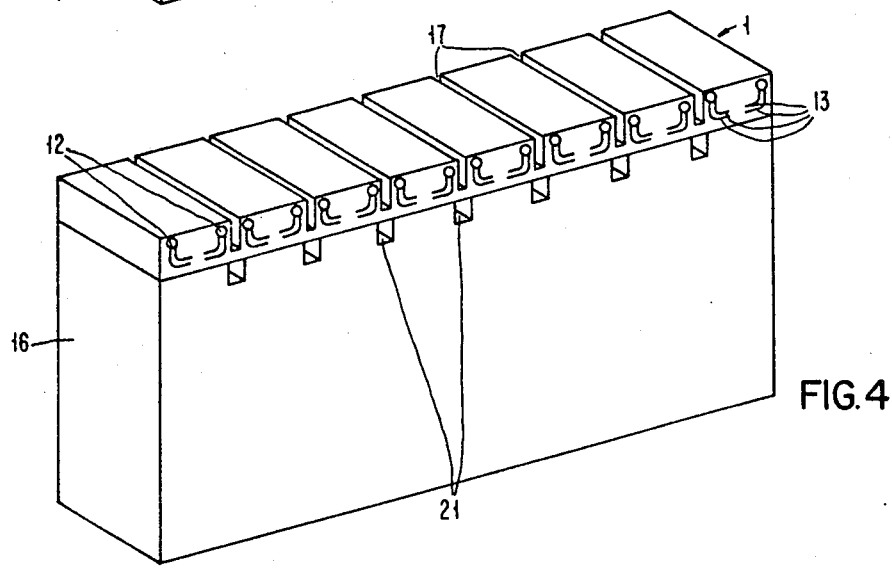
FIG. 4 is a perspective view of a workpiece comprising a row of magnetic heads which is fixed in a workpiece holder.
Figure 5:
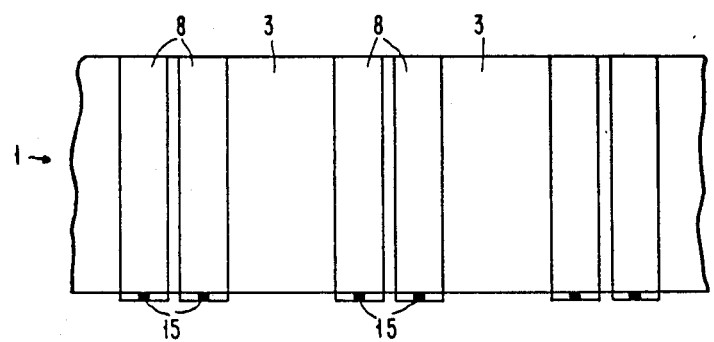
FIG. 5 is a plan view of a segment of the workpiece of FIG. 4 with mask covering applied thereon.

The plan view section in FIG. 4 depicts pole tips 15 embedded in the Al$_2$O$_3$ layer, exposed regions 8 of rails 11 to be introduced, and the mask 3-covered areas of recessed regions 9 to be made in workpiece 1. In the present case, it is assumed that the surfaces of pole tips 15 with their protective surrounding cannot be affected by the subsequent process steps. Otherwise, the respective areas would have to be covered by mask cover 3, too.

Figure 6:
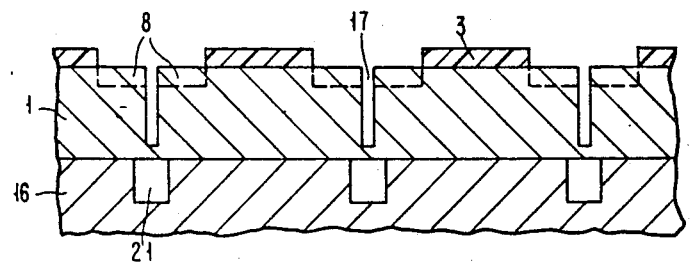
FIGS. 6–9 each show a cross section of the workpiece fixed on the workpiece holder, in the various process steps according to the present invention.
Figure 7:
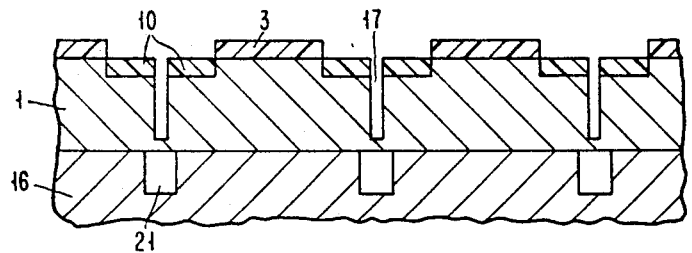

Workpiece 1 shown in a cross section in FIG. 6 with mask cover 3 is oxidized by using an 8% oxalic acid solution in regions 8, so that, as mentioned above, oxidized rail layers 10 can form in workpiece 1 in the necessary thickness between 20 nm–1 $\mu$m, but preferably between 100–200 nm (FIG. 7). As stated above, the process is executed in such a manner that the oxide can grow only very slightly out of the highly pure aluminum surface. At any rate, the oxidation process is discontinued when the predetermined thickness of rail layer regions has been reached.

Figure 8:
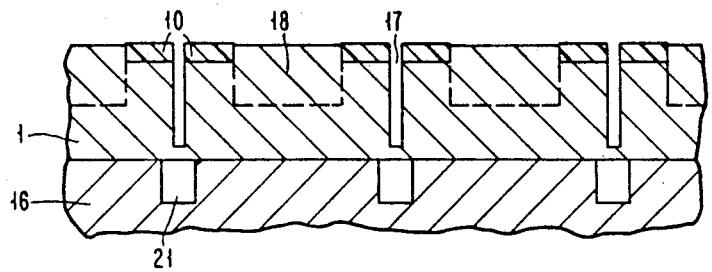
Figure 9:
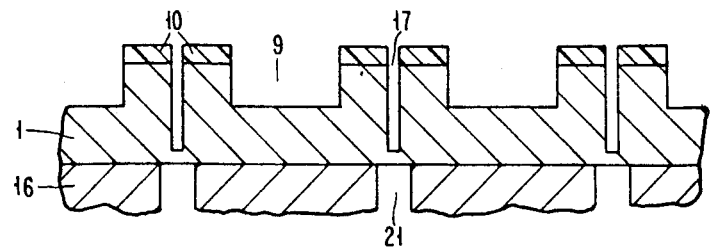

Following the removal of photomask 3, and using as an etching mask rail layer regions 10 consisting of aluminum oxide, regions 18, FIG. 8 are etched out to the respective rail height of at least 10 $\mu$m by applying wet chemical etching methods (FIG. 9). Thus, a structure is obtained where the respective recessed region 9 is limited by rails 11, with rail layer regions 10 consisting of aluminum oxide. In the subsequent lapping of the rail surfaces to a peak-to-valley height between 10 and 20 nm, the desired pole tip length between 1.5 and 2 $\mu$m is achieved simultaneously. After the removal from workpiece holder 16, and dividing, magnetic head sliders are obtained in the necessary structure and with the predetermined dimensions.

The use of highly pure aluminum offers an important advantage in that recessed region 9 between rails 11 can be structured following a wet chemical process, which compared with reactive ion etching of ceramic workpieces offers distinctly shorter etching periods (between approximately 20 and 30 minutes), and a lower peak-to-valley height on the floor of recessed regions 9. Greater peak-to-valley heights of the region floors are disadvantageous in the use of such magnetic head sliders, since they permit the deposition of abrasion particles and dust between rails 11 which affects the flight characteristics of the magnetic head slider.

When rail surface regions are made by the anodic oxidation of aluminum the oxide, as mentioned above, grows mainly into the aluminum workpiece and only slightly out of the surface. This means that an effective flying height planned for magnetic head sliders of e.g. 350 nm is actually only slightly increased after the implementation of the method as disclosed by the invention, contrary to the result of corresponding surface treatment by deposition processes, as evaporation or sputtering. Furthermore, with the invention being applied the oxide percentage going out of the surface can be influenced by the anodizing process itself in that as mentioned above the operating parameters can be adjusted in accordance with the respective requirements. Anodic oxide layers can be polished without any problems. A certain remaining porosity of rails 11 can only contribute to optimizing the sliding properties of the magnetic head slider since they improve the lubrication conditions during operation. In that connection it is of importance to note that the oxide layer porosity can be widely varied by executing the process accordingly.

As specified above, magnetic head sliders made in accordance with the invention are preferably used as carriers of thin film magnetic heads and can be of a tapering design at the trailing edges.

It is known that the growth of anodic oxide layers can be ascertained via the electric load flow by means of a current measuring following the function $\int I\, dt$, or by photooptical in situ methods at the effectively transparent aluminum oxide layer. Thus, the use of the method as disclosed by the invention offers means for executing the process control which is necessary for setting predetermined oxide layer thicknesses.

While the invention has been particularly shown and described with reference to a preferred embodiment thereof, it will be understood by those skilled in the art that various other changes in the form and details may be made therein without departing from the spirit and scope of the invention.

We claim:

1. The method for making magnetic head sliders out of a flat workpiece of highly pure aluminum whose first longitudinal surface corresponds, in its dimension that is normal to the length of the workpiece, to the length of the magnetic head slider, and whose second longitudinal surface that is normal to the first longitudinal workpiece surface is equipped with at least one magnetic head having its field line entry and exit surfaces flush with the first longitudinal workpiece surface, said method comprising the steps of:

anodically oxidizing a predetermined area of said first longitudinal workpiece surface extending in the direction of the length of the magnetic head slider to form an anodic oxidation aluminum oxide layer, said predetermined area extending along the edges of said magnetic head sliders and having the shape required to form rail surfaces;

etching said workpiece, using said anodically oxidized layer as a mask, to form recessed regions of predetermined depth and simultaneously form rails of the same configuration as said rail surfaces; and lapping said rail surfaces to give a surface finish defined by a predetermined peak-to-valley height so that said rails and said recessed region produce a predetermined flight height when said magnetic head slider is positioned adjacent a moving magnetic medium.

2. The method of claim 1 wherein said step of anodically oxidizing a predetermined area of said workpiece includes exposing said workpiece to an electrolyte comprising an 8% solution of oxalic acid at a temperature of not less than 50° C.

3. The method of claim 2 wherein the operating temperature of said oxalic acid solution is set to about 70° C.

4. The method of claim 1 wherein said step of anodically oxidizing a predetermined area of said workpiece is performed to produce a thickness of at least 20 nm of the aluminum oxide layer.

5. The method of claim 4 wherein the anodically oxidizing step is performed to produce a thickness of between 100 and 200 nm of the aluminum oxide layer.

6. The method of claim 1 further comprising the step of controlling the growth of the anodic oxidation layer in response to measuring the current flow through said electrolyte.

7. The method of making magnetic head sliders equipped with and electrically insulated from two respective magnetic heads, out of a flat workpiece of highly pure aluminum whose first longitudinal surface corresponds in its dimension, that is normal to the length of the workpiece, to the length of the magnetic head slider, and whose second longitudinal surface that is normal to the first longitudinal workpiece surface and equipped with magnetic heads having their field line entry and exit surfaces flush with the first longitudinal workpiece surface, as well as with their electrically conductive lands, correspond in their dimension that is normal to their length to the height of the magnetic head sliders, said method comprising the steps of:

providing a masking cover to an area of said workpiece between two respective pairs of magnetic heads to define recessed regions is said masked areas and rail surfaces in the unmasked areas, said masked areas extending in the direction of the length of the magnetic head slider along the first longitudinal workpiece surface;

anodically oxidizing the unmasked areas of said workpiece by exposing the wafer to 8% oxalic acid at a temperature of not less than 50° C. to form anodic oxidation aluminum oxide layers with a maximum thickness of 1 μm on said rail surfaces;

removing the masking cover from said workpiece at least from the intermediate regions between the rail surface regions;

lapping the rail surfaces to give a predetermined peak-to-valley height;

etching by means of wet chemical etching, using the anodic oxidation aluminum oxide layers as a mask, at least the recessed regions between the rail surface regions of said workpiece to a depth of at least 10 μm to form recessed pockets and to form rails simultaneously.

* * * * *